United States Patent Office 2,974,703  
Patented Mar. 14, 1961

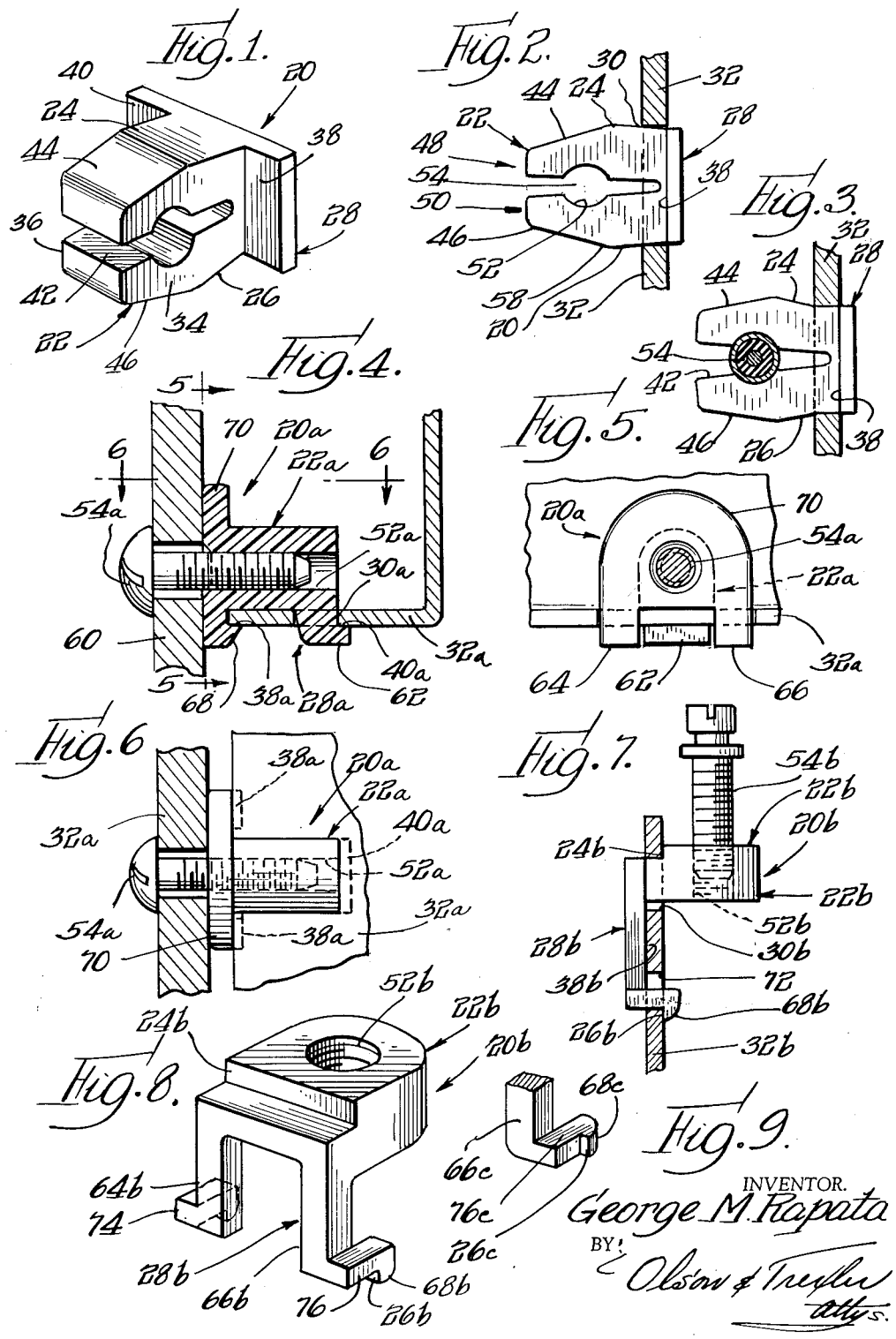

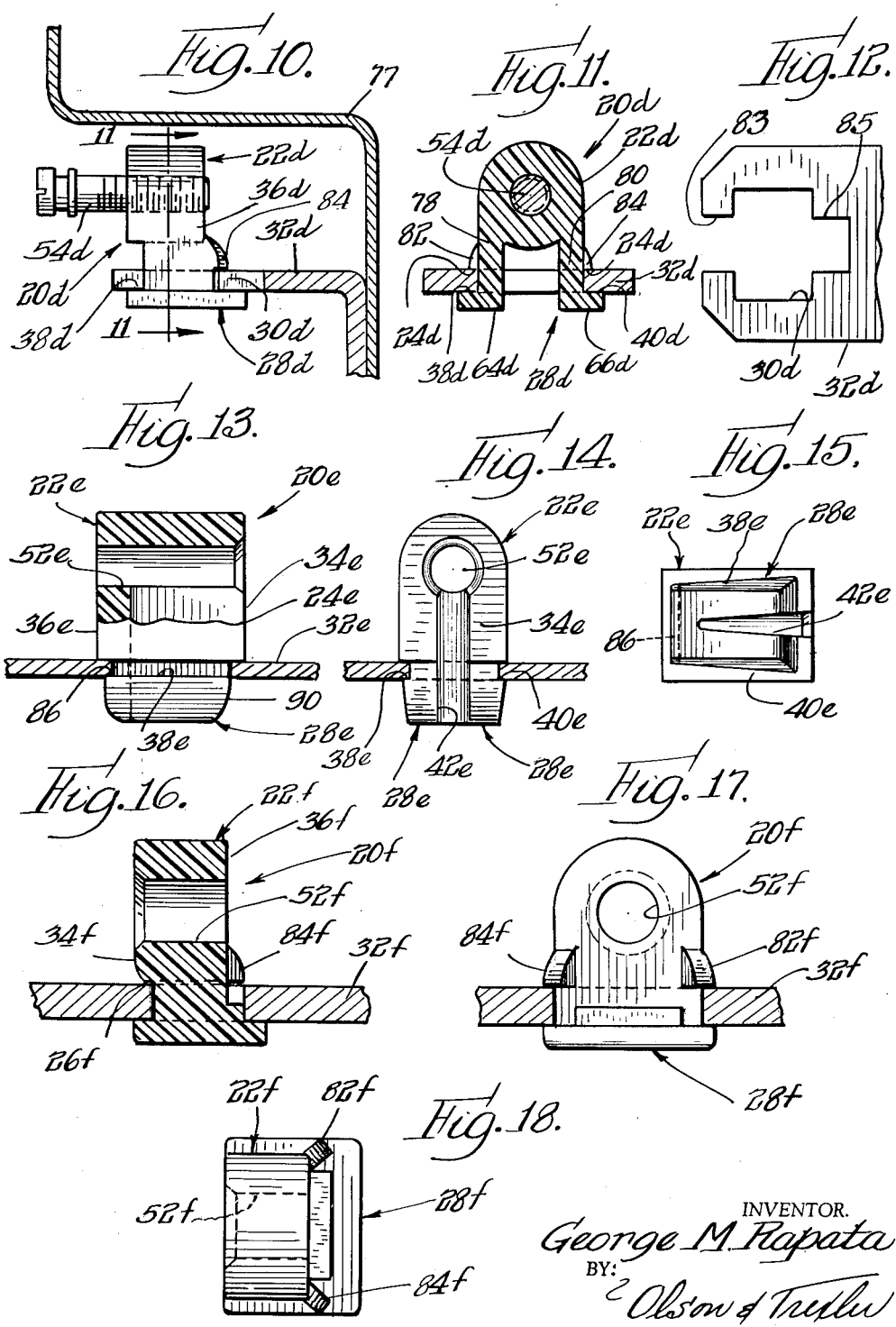

2,974,703

PLASTIC ANCHOR MEMBER HAVING A TRANSVERSE SCREW RECEIVING BORE

George M. Rapata, Park Ridge, Ill., assignor to Illinois Tool Works, Chicago, Ill., a corporation of Illinois Filed Nov. 29, 1956, Ser. No. 625,008

2 Claims. (Cl. 151—41.75)

The present invention relates to a novel fastening device, and more particularly to a novel device adapted to be applied to an apertured workpiece and to receive a screw member or the like.

There are numerous structures wherein it is necessary or desirable to mount a threaded member or screw on a workpiece so that it is disposed generally parallel to the workpiece. For example, in certain electronic chassis utilizing a printed circuit panel, it is desirable to support a carbon core having a threaded part substantially parallel to the panel for cooperation with a coil on the panel for providing a screw adjustment of the carbon core with respect to the coil. The above mentioned general arrangement of the screw member with respect to a workpiece has also been found to be useful for securing electronic chassis to wood cabinets and for automobile headlight adjustment screws.

An important object of the present invention is to provide a novel one-piece molded fastening device or anchor member which may be easily and securely applied to an apertured workpiece and which is adapted to receive and support a threaded member or screw so that the member is disposed transversely of the axis of the fastening device and/or substantially parallel to the apertured workpiece.

A more specific object of the present invention is to provide a novel one-piece molded plastic anchor member which is constructed so that it is adapted to be easily snapped through an aperture in a workpiece and securely connected to the workpiece and so that a portion thereof disposed at one side of a workpiece can accommodate and support a threaded member or screw located substantially entirely at one side of the workpiece.

Another more specific object of the present invention is to provide a novel fastening device or anchor member of the above described type which is constructed so as resiliently and aggressively to engage an apertured workpiece when fully applied thereto for insuring secure connection therewith and also for preventing relative rotation or other eccentric movement between the anchor member and the workpiece when the anchor member is fully applied to the workpiece so as to facilitate application of a threaded member or screw to the anchor member and to insure proper location of the threaded member or screw with respect to the workpiece when it is applied to the anchor member.

Other objects and advantages of the present invention will become apparent from the following description and the accompanying drawings wherein:

Fig. 1 is a perspective view showing a fastening device or anchor member incorporating the features of the present invention;

Fig. 2 is a partial sectional view showing the device of Fig. 1 applied to an apertured workpiece;

Fig. 3 is similar to Fig. 2 but further shows a threaded member assembled with the novel anchor member;

Fig. 4 is a sectional view showing a modified form of the present invention;

Fig. 5 is a sectional view taken along the line 5—5 in Fig. 4;

Fig. 6 is a sectional view taken along line 6—6 in Fig. 4;

Fig. 7 is a partial sectional view showing another modified form of the present invention;

Fig. 8 is a perspective view showing the novel anchor member of Fig. 7;

Fig. 9 is a fragmentary perspective view showing a further modification of the embodiment of Figs. 7 and 8;

Fig. 10 is a partial sectional view showing another modified form of the present invention;

Fig. 11 is a sectional view taken along line 11—11 in Fig. 10;

Fig. 12 is a fragmentary view showing an apertured workpiece adapted to receive the anchor member of Figs. 10 and 11;

Fig. 13 is a partial sectional view showing another modified form of the present invention;

Fig. 14 is a partial sectional view showing, in side elevation, the embodiment of Fig. 13 applied to an apertured workpiece;

Fig. 15 is an entering end view of the anchor member shown in Figs. 13 and 14;

Fig. 16 is a sectional view showing a further modified form of the present invention;

Fig. 17 is a side elevational view of the embodiment shown in Fig. 16; and

Fig. 18 is an entering end view of the embodiment shown in Figs. 16 and 17.

Referring now more specifically to the drawings wherein like parts are designated by the same numerals throughout the various figures, a fastening device or anchor member 20 incorporating one embodiment of the present invention is shown in Figs. 1–3. In this embodiment the anchor member comprises a body section 22 having opposite diverging side surfaces 24 and 26 which provide shoulder means engageable with one side of an apertured workpiece or panel, and an attachment section 28 engageable with an opposite side of a workpiece or panel and cooperable with the shoulder means or surfaces 24 and 26 for securely retaining the anchor member in assembled relationship with the workpiece. In this embodiment, the body section is provided with a polygonal and preferably rectangular cross sectional shape and is adapted to be inserted through a complementary rectangular aperture 30 in a workpiece or panel 32 as shown in Figs. 2 and 3. The broad and substantially flat surfaces 24 and 26 which flare outwardly in a direction extending axially away from the attachment section 28 and the other opposite flat side surfaces 34 and 36 of the body section are adapted to engage the straight side edges of the workpiece aperture 30 for preventing the anchor member from turning with respect to the workpiece. Preferably the attachment section is formed so that its width in one direction is substantially equal to the distance between the side surfaces 24 and 26 at their junction with the attachment section. However, the attachment section is elongated in another direction so as to provide workpiece engageable surfaces or shoulders 38 and 40 which project laterally substantially outwardly from the opposite side surfaces 34 and 36 of the body section.

The anchor member 20 is preferably molded in one-piece from suitable plastic material such, for example, as nylon, and the shoulders or surfaces 24 and 26 are formed so that the maximum distance therebetween is greater than the width of the workpiece aperture 30 whereby the body section must be collapsed during insertion thereof through the aperture. In order to facilitate such collapsing of the body section, a narrow generally axially extending slot 42 is provided therein, which slot traverses the sides 34 and 36. An entering end section of the body section is provided with converging cam surfaces 44 and 46 extending from junctions with the shoulders or surfaces 24 and 26, which cam surfaces cause opposite resilient finger portions 48 and 50 of the body section which are separated by the slot to be deflected inwardly when the cam surfaces engage edges of the workpiece aperture during assembly of the anchor member with the workpiece.

It is important to note that the body section 22 is provided with a bore or aperture 52 therethrough, which aperture traverses the axis of the anchor member and is preferably substantially parallel to the surfaces 38 and 40 of the attachment section. In other words, the aperture 52 is disposed so that when the anchor member is applied to a workpiece, the axis of the aperture 52 will be substantially parallel to the workpiece. The aperture 52 is formed with a smooth unthreaded wall having a diameter less than the diameter of a threaded member or screw to be inserted therein so that when a threaded member 54 is applied to the anchor member as shown in Fig. 3 complementary threads will be formed in the wall of the aperture. Furthermore, the aperture is substantially bisected by the slot 42 so that when the threaded member 54 is inserted into the aperture, the resilient portions 48 and 50 will be expanded or spread apart for more aggressively urging the shoulder surfaces 24 and 26 into engagement with the workpiece. Preferably, the aperture 52 is located substantially between the entering free extremity of the body section 22 and junctions 56 and 58 between the shoulder surfaces and cam surfaces of the body section and therefore in outer end more flexible portions of the opposite resilient portions 48 and 50 of the body section. This promotes more aggressive resilient engagement of the anchor member with a threaded member inserted in the aperture for restraining or locking the threaded member against turning from any desired adjusted position. As mentioned hereinabove, the threaded member 54 may be used for adjusting a carbon core or for securing another workpiece through the workpiece 32 or for any other desired purpose. In certain installations a rounded aperture may be provided in the workpiece so that the anchor member may be turned to permit access to the stud or threaded member so that the stud may be easily adjusted or turned.

Figs. 4–6 show another embodiment of the present invention wherein elements corresponding to those described above are indicated by identical reference numerals with the suffix *a* added. In this embodiment the anchor member 20a is adapted to be applied to a marginal portion of an apertured workpiece 32a, and in the particular structure shown for the purpose of illustrating the invention, the anchor member is adapted to receive a screw 54a for securing the workpiece 32a to another workpiece or frame member 60. In this embodiment, the body section 22a is solid except for the transverse aperture 52a which has a smooth wall so that the screw member will impress complementary threads therein. The attachment section of this embodiment includes a first portion 62 adapted to project through an aperture 30a in the workpiece and providing a shoulder 40a adapted to hook beneath the workpiece. Additional portions 64 and 66 of the attachment section are adapted to project around the margin of the workpiece and present shoulders 38a for hooking beneath the workpiece in the manner shown. In order to assemble the anchor member 20a with the workpiece, the anchor member is first tilted with respect to the workpiece and the hook portion 62 of the attachment section is inserted through the aperture 30a. Then the anchor member is pivoted about the hook portion 62 so that the hook portions 64 and 66 are resiliently flexed outwardly from the hook portion 62 and then snapped beneath the workpiece to the position shown in the drawings. Cam surfaces 68 on the hook portions 64 and 66 will initially engage the edge of the workpiece during the above mentioned pivotal movement of the anchor member and promote outward flexing of the hook portions 64 and 66 so as to permit the shoulder surfaces 38a to be snapped beneath the workpiece. Preferably, the body section is provided with an enlarged end flange 70 adapted to abut the frame member 60 so that when the screw member is tightened, the anchor member will be rigidly held with respect to the frame member.

Figs. 7 and 8 show an anchor member or fastening device 20b embodying another modified form of the present invention. This embodiment is particularly adapted for application to a workpiece 32b having a pair of apertures 30b and 72 therein. In this embodiment, the body section 22b is adapted to be inserted through the aperture 30b and is provided with a shoulder 24b at one side thereof for engaging one surface of the workpiece 32b after the body section has been inserted through the aperture and then shifted laterally to the position shown in Fig. 7. Elements 64b and 66b of the attachment section 28b extend laterally from the body section and oppositely from the shoulder 24b for overlying an opposite surface of the workpiece and terminate in flexible hooked finger portions 74 and 76 having shoulders 26b thereon adapted to be snapped through the aperture 72 for engaging the workpiece as shown in Fig. 7. In this embodiment, the shoulder surfaces 26b extend laterally away from the body section 22b in the same direction as the portions 64b and 66b and the cam surfaces 68b are provided at the ends of the finger portions so that the finger portions will be flexed back toward the body section when the shoulders are snapped through the aperture 72. Fig. 9 provides a fragmentary disclosure of an anchor member which is identical to the embodiment of Figs. 7 and 8 except that the finger portion 76c is disposed so that its shoulder 26c extends laterally outwardly of the element 66c, and, of course, the other finger element of this embodiment which is not shown and which corresponds to the finger element 74 may be similarly disposed.

Figs. 10–12 show another embodiment of the present invention wherein elements corresponding to those described above are designated by identical reference numerals with the suffix *d* added. In this embodiment the anchor member 20d is shown mounted on a workpiece or bracket 32d in a headlight assembly including a shell 77 for supporting a headlight adjusting screw. In this embodiment the body section 22d is adapted to be inserted through the workpiece aperture 30d and includes leg portions 78 and 80 connecting it with the elements 64d and 66d of the attachment section 28d. Resilient protuberances 82 and 84 project laterally outwardly respectively from the leg portions 78 and 80 and that the same side 36d of the body section for presenting shoulders 24d adapted to be snapped through the workpiece aperture for engaging the workpiece and for cooperating with the attachment section to secure the anchor member to the workpiece as shown in Figs. 10 and 11. By providing the relatively discreet shoulders at the same side 36d of the body section, the anchor member is permitted to float or twist a certain amount with respect to the workpiece 32d, which float is required for the adjusting screw 54d in a headlight assembly as will be understood. The adjusting screw 54d may be preassembled with the anchor member, and in order to permit such an assembly to be applied to the workpiece 32d, a slot 83 is formed between the end of the workpiece and the aperture 30d for providing clearance for the screw member. An additional slot 85 may be formed in the workpiece at the opposite side of the aperture 30d as shown in Fig. 12 for providing additional clearance for the screw member so that the screw member may be threaded through the anchor member body section so as to project from the side 36d thereof prior to assembly of the anchor member with the workpiece. It will be appreciated that the threaded member or screw may be preassembled with other embodiments of the anchor member disclosed herein, and if this is done in the embodiment of Figs. 7 and 8, for example, a clearance slot similar to the slot 83 will be provided in the workpiece 32d.

Figs. 13–15 show an anchor member 20e constructed in accordance with a further modification of the present invention. In this embodiment, the attachment section 28e is adapted to be snapped through the workpiece aperture and this is facilitated by the provision of slot means 42e which extends from the side 34e of the body section toward but short of the side 36e and also similarly extends through the attachment section 28e and intersects the aperture 52e. The attachment section is provided with shoulder means 38e and 40e along opposite sides thereof generally parallel to the slot means, which shoulder means decrease in width from the open side of the attachment section toward the closed side. The shoulder means 38e and 40e respectively merge with additional shoulder means 86 at the closed side of the attachment section, and the open side 90 of the attachment section is rounded as shown best in Fig. 13. The remaining sides of the attachment section are formed with cam surfaces which are inclined inwardly in a direction extending axially away from the shoulder means. Thus, the anchor member 20e may be easily applied to the workpiece by first inserting the narrower side 90 into the aperture and then pivoting the anchor member to axially align it with the workpiece aperture and force it into the aperture so that the attachment section 28e is collapsed sufficiently to enable the shoulders to be snapped beneath the workpiece.

Figs. 16–18 show an anchor member 20f incorporating another embodiment of the present invention. This embodiment is similar to the embodiment of Figs. 10–12 except that the attachment section is solid and, more importantly, the body section 22f is formed so as to provide a workpiece engaging shoulder 26f at the side 34f of the body section opposite from the protuberances 82f and 84f so as to restrain tilting or floating of the anchor member with respect to the workpiece.

While the preferred embodiments of the present invention have been shown and described herein, it is obvious that many structural details may be changed without departing from the spirit and scope of the appended claims.

The invention is claimed as follows:

1. A one-piece molded plastic anchor member adapted to be applied to an apertured workpiece for receiving a rotary threaded member having helical thread convolutions thereon, comprising an attachment section including means engageable with one side of a workpiece, and a generally axially extending body section of polygonal transverse cross section insertable through a complementary workpiece aperture and engageable with edges of the workpiece aperture for insuring predetermined orientation of the anchor member with respect to the workpiece, said body section including shoulder means on a first pair of opposite sides thereof for engaging a workpiece oppositely from said attachment section when the anchor member is applied to the workpiece, means providing an unthreaded bore in said body section disposed transversely of a common axis of the body section and the attachment section for receiving a threaded member and supporting the threaded member at one side of and generally parallel to a workpiece, said bore means extending between a second pair of opposite sides of said body section between said first pair of sides and said shoulder means and also being spaced from said attachment section axially of the body section at least as much as said shoulder means for facilitating collapsing of the shoulder means toward each other during application of the anchor member to a workpiece and subsequent expansion of the shoulder means into engagement with the workpiece during application of the threaded member to the bore means, said body section having a wall thickness around and radially of said bore means substantially greater than the depth of the helical thread convolutions on said threaded member so that full depth threads may be formed in said body section during insertion of the threaded member into said unthreaded bore means, said body section having a susbtantial transverse thickness between said second pair of opposite sides for simultaneously threadedly engaging a plurality of the helical thread convolutions of the threaded member when the threaded member is fully applied to the bore means, and said body section including means providing a slot disposed parallel to a longitudinal axis of said bore means and extending between said second opposite sides of said body section and from an entering end of said body section through said bore means and toward said attachment section for further facilitating collapsing and subsequent expansion of said shoulder means, said slot being narrow so that the only access to said bore means for insertion of the threaded member is through one of the ends of the bore means.

2. A one-piece anchor member, as defined in claim 1, wherein said attachment section is elongated transversely of said body section so as to present said workpiece engageable means of the attachment section laterally outwardly of said second pair of opposite sides of said body section, and said attachment section includes side edges provided by continuations of said first pair of opposite sides of the body section.

References Cited in the file of this patent

UNITED STATES PATENTS

| 887,543 | Symonds | May 12, 1908 |
|---|---|---|
| 2,004,679 | Tinnerman | Jan. 9, 1933 |
| 2,661,821 | Tinnerman | Dec. 8, 1953 |
| 2,683,577 | Flora | July 13, 1954 |
| 2,688,655 | Gross | Sept. 7, 1954 |
| 2,786,196 | Haynes | Mar. 19, 1957 |
| 2,819,858 | Mittendorf | Jan. 14, 1958 |
| 2,873,496 | Elms | Feb. 17, 1959 |

FOREIGN PATENTS

| 561,627 | Great Britain | May 26, 1944 |
|---|---|---|
| 599,050 | Great Britain | Mar. 3, 1948 |
| 707,819 | Great Britain | Apr. 21, 1954 |
| 1,108,208 | France | Aug. 24, 1955 |